US005722046A

United States Patent [19]

Serfaty et al.

[11] Patent Number: 5,722,046
[45] Date of Patent: Feb. 24, 1998

[54] METHOD OF OPERATION OF A RADIO SYSTEM

[75] Inventors: Salomon Serfaty, Doar Gaash; Uzi Zakai, Reuth; Efraim Rushinek, Tel Aviv; Shimon Dick, P.Kiriat Malachi, all of Israel

[73] Assignee: Motorola, Inc., Schaumburg, Ill.

[21] Appl. No.: 489,645

[22] Filed: Jun. 12, 1995

[30] Foreign Application Priority Data

Jun. 11, 1994 [GB] United Kingdom ............. 9411770

[51] Int. Cl.⁶ ..................... H04B 7/26; H04B 1/16
[52] U.S. Cl. ........................... 455/38.3; 455/343
[58] Field of Search ........................... 455/38.3, 343, 455/38.1, 38.2, 32.1, 230, 231, 54.1; 340/825.44, 311.1; 371/69.1

[56] References Cited

U.S. PATENT DOCUMENTS

| | | | |
|---|---|---|---|
| 4,995,099 | 2/1991 | Davis | 455/343 |
| 4,996,526 | 2/1991 | DeLuca | 455/343 |
| 5,175,874 | 12/1992 | Auchter | 455/343 |
| 5,396,660 | 3/1995 | Cannon | 455/343 |

Primary Examiner—Nguyen Vo
Attorney, Agent, or Firm—George C. Pappas; James A. Coffing

[57] ABSTRACT

A method is described of operating a radio system having a transmitter unit (10) and a receiver unit (11). At the transmitter unit, at least a potion (50) of an address is transmitted repeatedly for a predetermined period of time ($T_w$), followed by a message. The receiver unit switches from a dormant, low power mode to a receive mode after a period of time in the dormant mode not exceeding the predetermined period of time ($T_w$). In the receive mode address information is received and compared bit by bit with a predetermined address stored at the receiver unit. The receiver revels to the dormant mode as soon as a negative comparison is made, to a predetermined degree of non-correlation, between address information received and the predetermined address, thereby saving battery power.

6 Claims, 4 Drawing Sheets

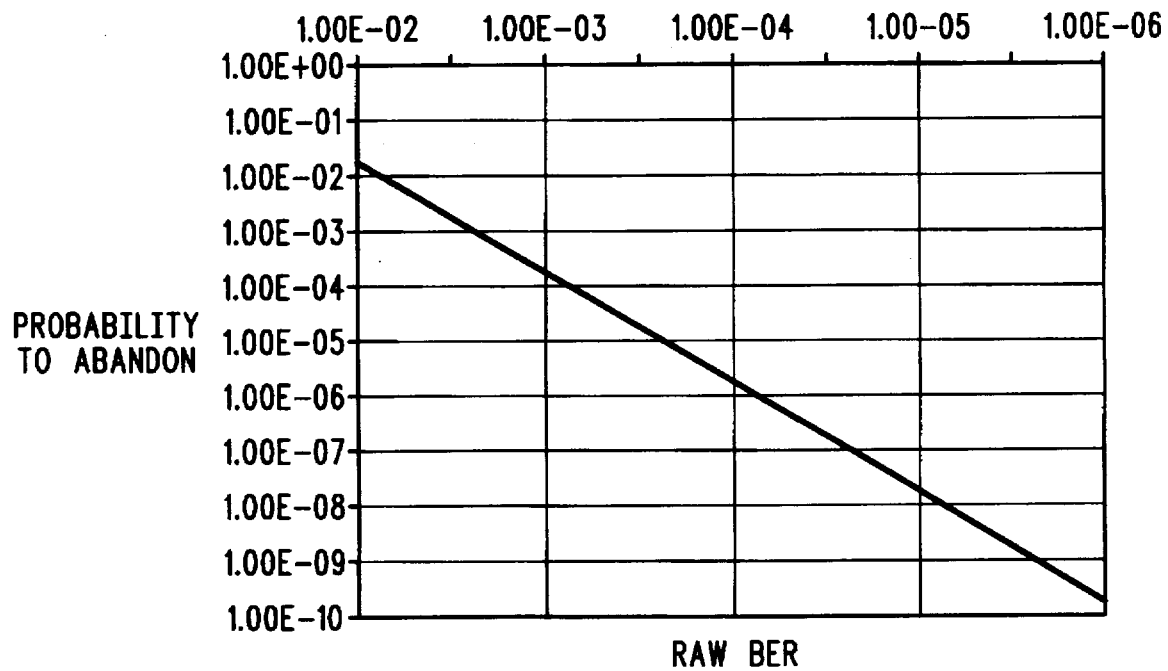

METHOD OF OPERATION OF A RADIO SYSTEM

FIELD OF THE INVENTION

This invention relates to a method of operation of a radio system, for example a system of remote terminal units, that is to say units of a system that supervise or control another system and that are in communication with a central unit for central control or supervision.

BACKGROUND TO THE INVENTION

Supervisory control and acquisition of data (SCADA) systems, such as Motorola's INTRAC and MOSCAD systems provide remote control of a remote terminal unit (RTU) from a central unit over a radio and/or line link. The RTU may directly control the system which is being supervised and controlled, for example an irrigation system, by direct connection between the RTU and relay solenoids, sensors and other elements of the system under control. For greater capacity, the RTU can supervise and control the system via one or more terminal units. A number of terminal units can be connect to a single RTU. Each terminal unit can control a number of elements or receive data from a number of elements. In this manner there is a high degree of fan-out between the RTU and the elements being supervised and controlled. Typically the RTUs control solenoids in SCADA irrigating systems. The solenoid operates a tap controlling the closing and opening of the water flow in a pipe, so that irrigation by sprinklers and/or other means can be controlled from a distance. The RTUs "read" the state of the contacts and/or pulses, and so can check the sensors' state of contacts and measure the amount of water passing through by means of the water meter pulses.

Irrigation systems in use today in places such as parks, municipal gardens, traffic islands, golf courses, etc., have installed RTUs to operate the system at a distance, either by land lines or by radio, according to the program manually fed to the RTU. In locations where there is a power net, the RTU is placed in a box above ground level, generally in a central location where it can be hooked up to the net, and power lines run from it to control the solenoids (AC). The solenoids are located on the water taps, and are used to control the flow of water in the pipes or on the sprinkler, to control the sprinkler's operation. In places where there is no access to the power net, the RTU is placed in a box above ground level, generally in a central location, and powered by a battery. Most systems charge the battery with solar cells located nearby. DC solenoids are installed in proximity to the RTU and connected to the RTU's power source. Hydraulic transfer tubes carry the commands from the solenoid to the water controls.

Solar cells have certain disadvantages including their vulnerability to obscuring by dirt or to damage or vandalism, their expense and their need for maintenance.

Communications protocols exist in the field of paging receivers which are quite efficient in terms of power drain and require only a few milliamps of current drain from the battery. An example of current-efficient operation of such a protocol can be found in International Patent Application No. WO82/02126. A pager, however, is a device that is carried by the user and its battery can readily be changed or recharged. With an RTU, the cost of locating the RTU, accessing it and changing its battery is substantial. Even with modern high capacity batteries of typically 10 ampere hours, existing techniques would require a battery change at least every year, which equates to a substantial maintenance expense, since systems extend to typically 1000 RTUs. The expense involved is in terms of manpower and battery cost, as these high capacity batteries are themselves very expensive.

There is a need for a more energy-efficient communications protocol.

SUMMARY OF THE INVENTION

According to the invention, a method is provided of operating a radio system having a transmitter unit and a receiver unit. The method comprises the steps of: at the transmitter unit, transmitting at least a portion of an address repeatedly for a predetermined period of time, followed by a message, and at the receiver unit, switching from a dormant, low power mode to a receive mode after a period of time in the dormant mode not exceeding the predetermined period of time. When in the receive mode, address information is received and the address information is compared bit by bit with a predetermined address stored at the receiver unit. The receiver reverts to the dormant mode as soon as a negative comparison is made, to a predetermined degree of non-correlation, between address information received and the predetermined address, but remains in the receive mode in the event of a correspondence between the received address and the stored address information until the message is received and thereafter it returns to the dormant mode.

In this manner, a protocol is provided for the transmission of control information to unattended units via a radio channel. The unattended units may be incapable of providing an acknowledge to the received information but the protocol ensures extreme reliability in the information transfer.

The receiving unit uses a power saving mode by which it wakes up every $T_w$ seconds and if it does not receive a message addressed to it, it goes back to sleep. The time the unit remains 'on' in order to identify a message is minimized so that its energy consumption is made as low as possible. This fact is taken into account in the protocol design to minimize the probability of a unit missing a message addressed to it.

The predetermined period of time ($T_w$) can be changed from time to time, for example at different times of day or year. This is advantageous in an irrigation system, for example, in which irrigation takes place at night or predominantly at certain times of year.

In accordance with other aspects of the invention, a remote terminal unit is provided and a method of operation of a receiver is provided, as defined in the independent claims.

A preferred embodiment of the invention will now be described, by way of example, with reference to the drawings.

BRIEF DESCRIPTION OF THE DRAWINGS

FIGS. 5 to 8 are graphs for illustrating the performance of the protocol of FIG. 3.

DETAILED DESCRIPTION OF THE PREFERRED EMBODIMENT

Figure 1:
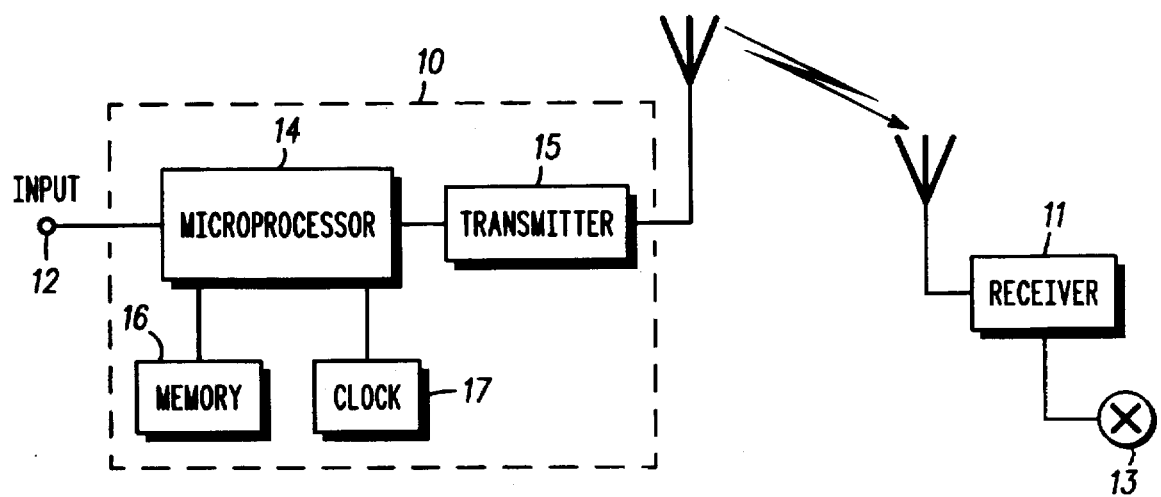
FIG. 1 is an overall block diagram of a radio system in accordance with the present invention.

Referring to FIG. 1, a radio system is shown comprising a transmitter 10 and a receiver 11. The transmitter receives an input 12, which may be a control instruction intended for the receiver 11 or may be some other message. The receiver 11 is, in this example, connected to an element 13 of a system to be controlled by the receiver. The element 13 may, for example, be a solenoid operated water valve of an irrigation system.

The transmitter 10 comprises a microprocessor 14, a radio transmitter circuit 15, a read-only memory 16 and a clock 17.

For a given input, the microprocessor 14 compiles a message frame, described in detail below, including an address read from memory 16, identifying the particular receiver 11 (from a number of other receivers not shown), for which the message is intended and including data intended for that receiver.

When a receiver 11 is used in this manner to control another system element 13, it is commonly called a remote terminal unit (RTU).

Figure 2:
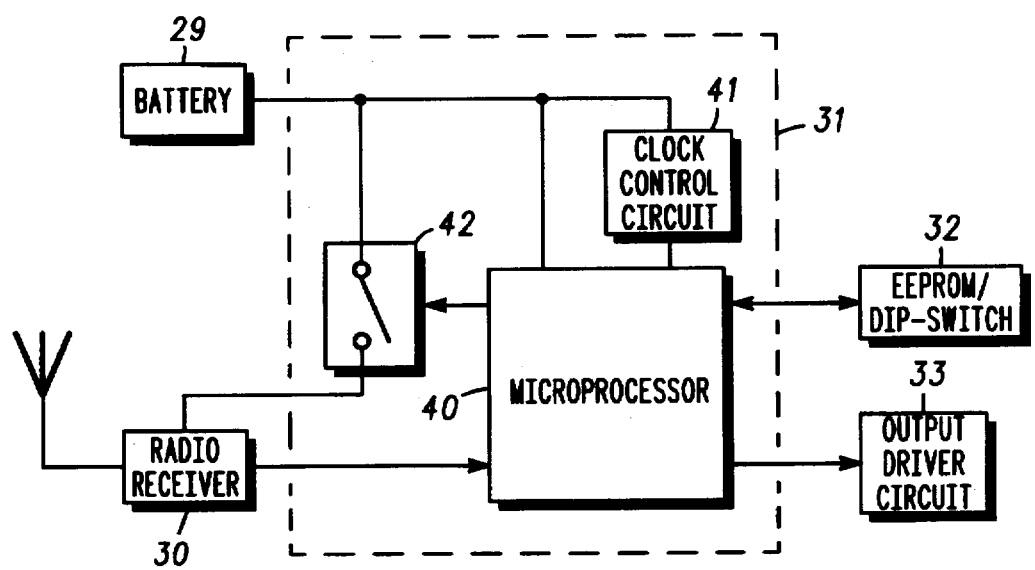
FIG. 2 is a block diagram of the radio receiver of the system of FIG. 1.

FIG. 2 shows details of the receiver 11. It includes a battery 29, a radio receiver circuit 30, logic circuits 31, DIP SWITCH/EEPROM 32 and an output driver circuit 33 to the system element 13.

The radio receiver circuit 30 is a pager receiver such as is described in WO82/02126 and operates in a low voltage range (1.2– 1.5 V) and requires a small amount of current (6 milliamperes max.). An alternative radio receiver is the UAA2080T advanced pager receiver manufactured by Philips Semiconductors. The receiver frequency range is UHF or VHF.

The logic circuits 31 comprise a dual clock-rate microprocessor 40, a clock control circuit 41 and a power control circuit 42. The microprocessor performs the following operations: control of radio operation; deciphering data from the radio; mode management (run mode or sleep mode); output driver control; "reading" inputs (not shown) and reading/writing on the EEPROM or DIP-SWITCH reading.

The EEPROM or DIP-SWITCH circuit 32 is intended for saving the important parameters for the control (various addresses, etc.) during periods when the control is not connected to a battery. The EEPROM is read by the logic circuits 31 by serial communication.

The output driver circuit 33 provides the intended output, whether this is a digital display, an alarm or, in the case of an irrigation system, the operation of a solenoid. In the latter case it charges a condenser (not shown) to the voltage required for commanding the solenoid and discharges the condenser according to the desired command, which will cause a change in the state of the solenoid.

The circuits 31 cause the receiver 11 to operate in either run mode or sleep mode. In run mode, the power control circuit 42 supplies power to the receiver circuit 30 and data is received and decoded by the microprocessor 40. If the data successfully identifies the address of the receiver 11, as identified by comparison with a unique address of the receiver stored in EEPROM 32, an output is provided to driver 33. If the receiver 11 is not addressed, it enters the sleep mode and the microprocessor 40 causes the power control circuit 42 to remove power from the receiver and the clock control circuit 41 places the microprocessor 40 in a low speed, low power mode. The microprocessor 40 remains in this mode, performing a timing function, until a predetermined time-out $T_w$ has lapsed (timed from the start of the last entry to run mode), whereupon it re-enters the run mode to attempt to receive more data (from the next transmitted frame).

In the preferred communications protocol, the transmission of information is done in frames. Each receiver unit has an address that can consist of $N_a$ bits, which in the present case is set to 16, that is up to 65,536 units can be addressed.

Figure 3:
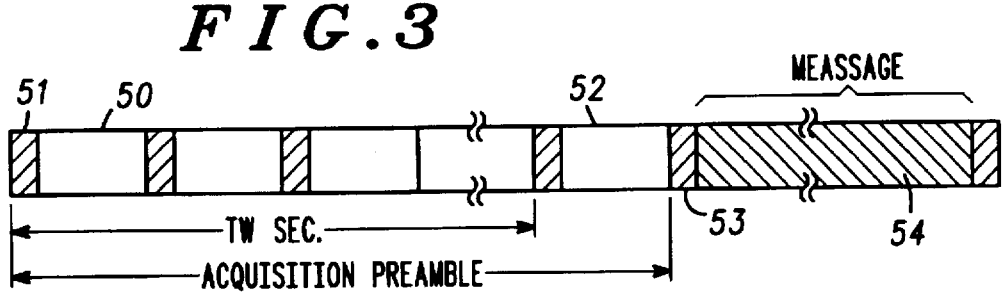
FIG. 3 is a time diagram showing the composition of a frame of the communication protocol used by the system of FIG. 1.

The preferred transmission frame is depicted in FIG. 3. It consists of a repetitive sequence 50 that contains a portion of the address of the intended receiver 11—i.e. the $N_a/2$ least (or most) significant bits of the address of the unit 11 preceded by a synchronization flag 51. In the preferred embodiment, this portion 50 contains the eight least significant bits. These elements 50 and 51 are transmitted for $T_w$ seconds. At its end, an additional transmission 52 of the least significant bits is appended. This ensures that a listening unit will always have the opportunity to find the address. This part of the frame will, for convenience, be called the "acquisition preamble".

Following this part, a further synchronization word 53 is transmitted, followed by the message 54, followed in turn by a final frame synchronization word 55.

Figure 4:
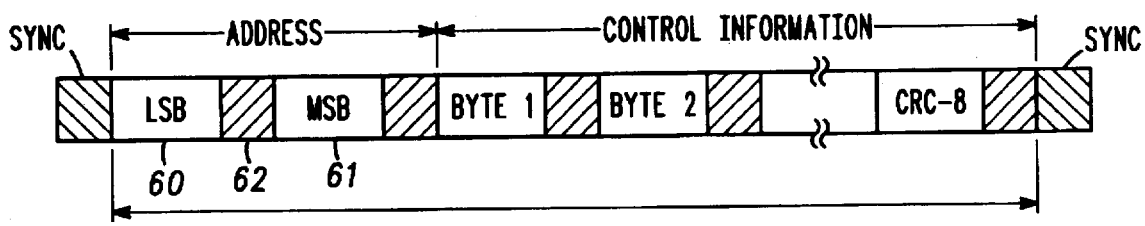
FIG. 4 is a time diagram showing the composition of the message part of the frame of FIG. 3.

The message 54 is shown in FIG. 4 and may be composed of an arbitrary number of bytes. The first bytes 60, 61 of the message are (in the preferred embodiment) the entire address of the unit. In this specific example, two bytes form the entire address. A cyclical redundancy check (CRC) 62 is computed by the microprocessor 14 at the transmitter on each part of the message and appended to it. For this specific example, the proposed CRC polynomial is the following:

$$g(\chi)=1+\chi^2+\chi^3+\chi^4+\chi^8$$

The message is further encoded using an error correcting code with an error correcting capability of $t_e$. In this example, a shortened (12,8) Hamming code is used. Using this code, four bits of redundancy 62 are added to every byte to form a code word. The code can correct any single error in a code word (12 bits), i.e., $t_e=1$.

At the receiver 11, message decoding consists of two parts, error correction and error detection.

Error correction is first used to try and correct any errors introduced during the reception of the message. Some error correction techniques can detect some uncorrectable errors. In this case, if an uncorrectable error is detected by the microprocessor 40 using the error correction code, the entire message is rejected and the microprocessor 40 causes the receiver 11 to enter the sleep mode.

Once errors have been corrected and if no uncorrectable errors have been detected, the CRC is recomputed on the resulting data. If the computed CRC does not match the transmitted CRC, the entire message is rejected and the receiver enters the sleep mode.

The preferred operation of the receiver and how it decides if a message is directed to it is now described. A goal is to minimize the time a receiver remains in the run mode. The receiver wakes up, as said, every $T_w$ seconds. In the preferred embodiment, $T_w$ is equal to 2 seconds. The address is two bytes long. The partial address field 50 transmitted prior to the message 54 includes only the less significant byte (LSB) of the address. The error correcting capability of the Hamming code used is equal to 1 bit for every 12 transmitted bits (8 bits of information and 4 bits of redundancy).

The following process is used at the receiver microprocessor 40.

Phase 1—Sync Search

The receiver starts by looking for a synchronization signal 51. It is possible that the receiver has started during the 'message' portion of the transmission. Observation should be made to the fact that, during the 'Acquisition Preamble', the synchronization sequence is inserted every 8 bits. To allow an early abandon, it is postulated that, if the number of decoded bits without hitting a synchronization reaches 9 bits, the receiver goes back to sleep.

If synchronization has been detected prior to getting to the above condition, the process proceeds to phase 2.

Phase 2—Address Decoding

After decoding the synchronization, the receiver operation may be in one of two fields: the partial address field or the message field. The partial address field has only 8 bits in it, while the message field is composed of more than 8 bits.

Independent of what field it is in, the receiver starts decoding bits. If, at any time, the Hamming distance between the decoded address and the unit address is larger than the error correcting capability of the code, in this case 1, the receiver abandons and enters the sleep mode.

If, after decoding 8 bits, the Hamming distance is 0 or 1, the two cases are differentiated.

Case a: decoding was proceeding in the partial address field; the next field is decoded. If the Hamming distance reaches 2, abandon. Else, continue the decoding process.

Case b: decoding was proceeding in the message field: using the next 4 bits, perform error correction of the first byte. If, after error correction, the corrected byte is not equal to the LSB of the address, abandon. Else, set the Hamming distance to zero and continue decoding the next byte. If during this decoding process, the Hamming distance reaches again a value of 2, abandon. If the Hamming distance at the end of the next byte is 0 or 1, perform error correction using the next 4 bits. If after error correction the second corrected byte is not equal to the MSB of the address, abandon.

With the above algorithm in mind, the average time to abandon can be computed. Certain assumptions need to be made. Assume that the transmitted address does not correspond to that of the unit. Assume that the receiver starts collecting bits during the partial address repetition period. It will have to wait for the synchronization and then decode the address to find out if it is its own address (LSB part). It is easily shown that, in the average, if one address needs to be matched, it takes 4 bits to abandon.

Assume only one address match (LSB only) and that the Hamming distance between the transmitted address and the current address is at least two. The average time to abandon will be equal to:

$$T_{au}^1 = 0.5\ T(\text{Address}) + T(\text{Sync}) + 4\ T(\text{bit}) \quad (1)$$

If the Hamming distance is equal to 1, it will have to look at two addresses to determine that it is not a match.

$$T_{au}^2 = 0.5\ T(\text{Address}) + T(\text{Sync}) + T(\text{Address}) + T(\text{sync}) + 4\ T(\text{bit}) \quad (2)$$

The probability of the transmitted address being at a Hamming distance of exactly one is equal, for random addresses, to 8/256=1/32. Observe that the probability of not meeting this condition is its complement to 1, i.e., 31/32.

The probability of falling into this space, i.e., the partial address repetition period is equal to the ratio between the total address repetition period and the total transmission length. This can be expressed as:

$$P(A) = \frac{2\ \text{sec} + T(\text{sync}) + T(\text{Address})}{2\ \text{sec} + T(\text{sync}) + T(\text{Address}) + T(\text{sync}) + T(\text{Message}) + T(\text{sync})} \quad (3)$$

Therefore if the transmitted address does not match, in its LSB, the unit's address, the mean time to abandon is equal to:

$$T_{au} = P(A)[(31./32.)T_{au}^1 + (1./32.)T_{au}^2] \quad (4)$$

Next consider the case where there is a match in the LSB of the address. Assuming random addresses, this can occur with a probability of 1/256. Assuming that the receiver starts collecting bits during the address repetition period. In this case, it will have to wait for the message in order to find out if its MSB also matches. In the average, it will have to wait:

$$T_{am} = P(A)[1\ \text{second} + T(\text{sync}) + T(\text{Address}) + T(\text{sync}) + T(\text{Address}) + T(\text{FEC}) + 4T(\text{bits})]/256 \quad (5)$$

The first term inside the square bracket is due to the fact that it is not known exactly where the receiver started collecting bits. Observe also that it needs, in the average to wait for 4 bits of the MSB to determine that the address is wrong.

Last, consider the case where the receiver starts during the message period. The probability of this happening is equal to $P(M)=1-P(A)$. It will take 9 bits to determine that this is the case. The average time to abandon is equal to:

$$T_m = P(M)[9T(\text{bit})] \quad (6)$$

The total average time to abandon can therefore be written as $$T(\text{Abandon}) = T_{au} + T_{am} + T_m$$

A table can be presented with the numbers that correspond to a specific example. Assuming that the bit rate in the channel is equal to 600 bps. A synchronization sequence of duration equal to 4 bits is used. This synchronization sequence is constructed such that it does not resemble the transmitted data. For example, if frequency shift keying (FSK) is used to transmit the data, where a binary 0 is represented by (say) frequency f0, 1200 Hz for example, and binary 1 by f1, 1800 Hz for example, the synchronization sequence can be transmitted using frequency fs, 2400 Hz for example, thus making it clearly distinct from the data.

The raw part of the message consists of 14 bytes.

| Variable | Relation | Value |
| --- | --- | --- |
| T(bit) | 1/600 | 1.66 msec |
| T(Address) | 8T(bit) | 13.33 msec |
| T(sync) | 4/600 | 6.66 msec |
| T(Message) | 168 T(bit)* | 280 msec |
| $T_{au}^1$ | Expression (1) | 20 msec |
| $T_{au}^2$ | Expression (2) | 40 msec |
| P(A) | Expression (3) | 0.873 |
| $T_{au}$ | Expression (4) | 18 msec |
| $T_{am}$ | Expression (5) | 3.6 msec |
| P(M) | 1 - P(A) | 0.127 |
| $T_m$ | Expression (6) | 1.9 msec |

From the above table, it can be computed that, for this particular case:

$$T(\text{Abandon}) = T_{au} + T_{am} + T_m = 18 + 3.6 + 1.9 = 23.5\ \text{msec}$$

In the particular case analyzed, the receiver remains in operation for an average of 23.5 msec of the 2 seconds, that is, 1.1% of the time.

Figure 5:
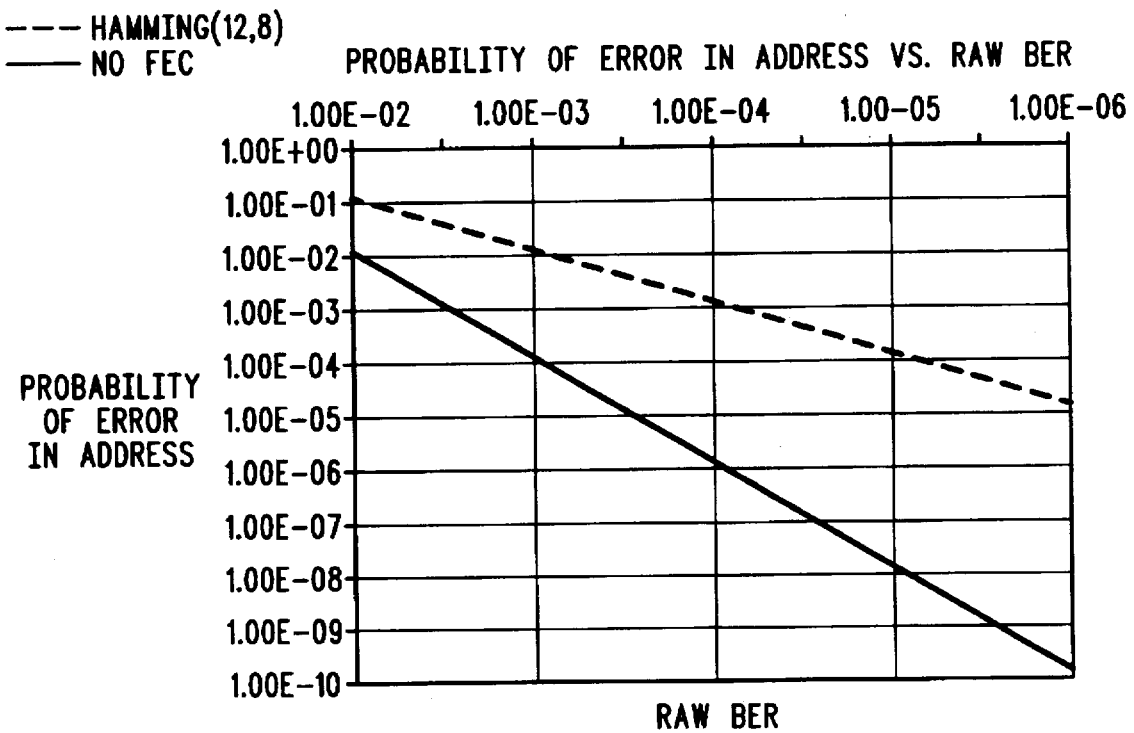
Figure 6:
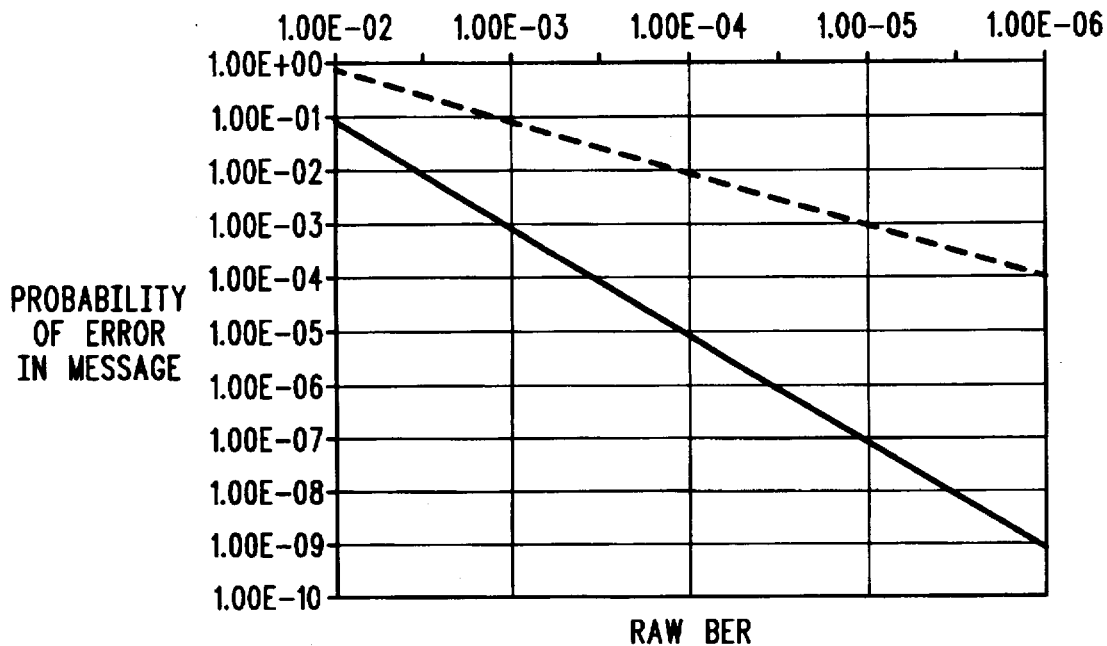
Figure 7:
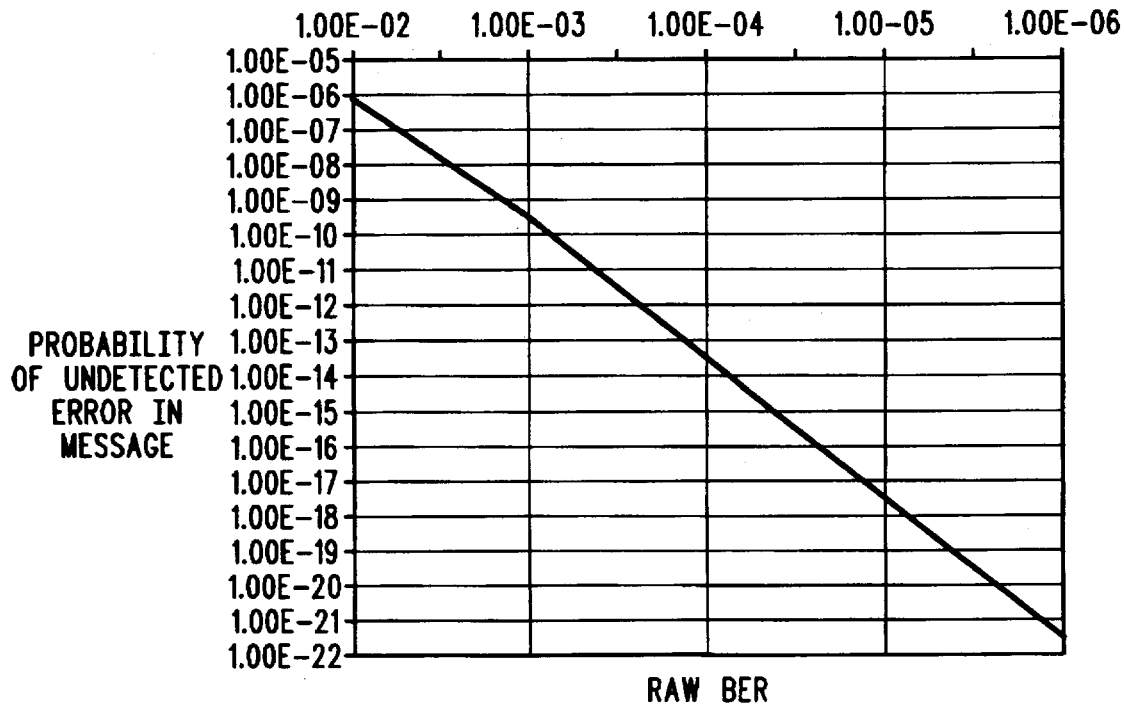

The performance of the combination error correction/error detection is presented in graphical form in FIGS. 5, 6 and 7. The known variable is the raw bit error rate at the decoder input.

In FIG. 5, the probability of error in decoding the address is presented, for the particular case presented above. Observe that, with a raw BER of 1.E-5, the probability of error in the address is of the order of 1.E-8 when using FEC while 1.E-4 without FEC.

FIG. 6 presents results of probability of error for the entire message, where the number of uncoded bytes is say 14 bytes (including CRC). Again, observe that for a raw BER of 1.E-5, one out of every 1,000 messages is in error if no FEC is used while, if FEC is used, one out of every 10 millions is in error.

FIG. 7 presents the probabilities of undetected errors. That is, a message is corrected according to the previous rules and its CRC checked and, nevertheless, the message, although wrong, is accepted by a unit as a valid message.

Reliability of Abandon Process

Assuming that the transmitted address is equal to that of the unit into consideration and, using the criteria expressed above to abandon, it is possible to determine what is the probability to erroneously abandon as a function of the raw bit error rate in the channel.

Different cases can be considered.

(i) Suppose that the receiver is decoding the LSB of the address and the Hamming distance reaches 2; this will be a sufficient condition for abandon.

(ii) A second condition is that the Hamming distance reaches two in two consecutive words which can occur if the first LSB word has exactly one error and the second one at least one error or if the first LSB word has no errors and the second one more than 1 error.

(iii) A third condition to abandon is if the number of errors in the address LSB and its FEC is two or more.

More cases may occur in practice but which have lower probability than the ones expressed above.

The probability of abandoning due to errors will be the sum of all the probabilities expressed above. This probability is expressed graphically in FIG. 8.

This arrangement described concentrates in the definition of a protocol to send messages to unattended units and an algorithm aimed to minimize the time a unit is in the reception state to decide that a message is not directed to that particular unit.

The predetermined period of time ($T_w$) can be changed from time to time, for example at different times of day or year. One manner of implementing this is by the transmitter 10 addresing all receivers 11 in turn and issueing a message to each of them to increase $T_w$. When all reveivers have been paged, the transmitter 10 can increase its own value for $T_w$. This is advantageous in an irrigation system, for example, in which irrigation takes place at night or predominantly at certain times of year. At the end of the period of increased $T_w$, each receiver must be paged again to revert to the previous value.

Note that the protocol avoids the need for sychronization between all remote units. This represents a saving in power consumption.

The arrangement provides for much lower power consumption than known paging systems (e.g. where a paging message is sent-to the unit and it is displayed for the user to read). In a paging environment, the receiving unit should be capable of acceptably decode the message even when the bit error rate in the channel is on the order of 4%. In the arrangement described above, the protocol has been optimized for lower error rates, of the order of 1 error in 100,000 bits, so that it is simplified and the average energy consumption of the unit is minimized.

What is claimed is:

1. A method of operating a radio system having a transmitter unit and a receiver unit, the method comprising the steps of at the transmitter unit, transmitting repeatedly for a predetermined period of time, an initial portion only of the address, followed by a remainder portion of the address, followed by a message, and at the receiver unit, switching from a dormant, low power mode to a receive mode after a period of time in the dormant mode not exceeding the predetermined period of time, in the receive mode, receiving address information, comparing the address information bit by bit with a predetermined address stored at the receiver unit, reverting to the dormant mode as soon as a negative comparison is made, to a predetermined degree of non-correlation, between address information received and the predetermined address, and remaining in the receive mode in the event of a correspondence between the received address and the stored address information until the message is received and thereafter returning to the dormant mode.

2. A method according to claim 1, wherein the step of receiving the address information comprises receiving the initial portion of the address, and wherein the step of comparing comprises:

comparing the initial portion with a corresponding initial portion of the stored address and, when the step of comparing results in correspondence between the initial portions, receiving any repetitions of the initial portion of the address and receiving the remainder portion of the address and comparing the remainder portion as received with a remainder portion of the predetermined address and remaining in the receive mode in the event of a correspondence between the received remainder portion and the stored remainder portion until the message is received and thereafter returning to the dormant mode.

3. A method according to claim 2, wherein the step of comparing the remainder portion as received with the stored remainder portion of the predetermined address comprises comparing the portions bit-by-bit and reverting to the dormant mode as soon as a negative comparison is made, to a predetermined degree of non-correlation, between the remainder portions.

4. A method according to claim 1 wherein the predetermined degree of non-correlation is a non-correlation in more than one but no more than four bits.

5. A method according to claim 1, further comprising the step of, at the transmitter unit, providing frame markers between repeatedly transmitted portions of the address.

6. A method according to claim 5, wherein the address and message are transmitted using frequency shift keying over two frequencies and the frame markers are transmitted over a third frequency.

* * * * *